United States Patent
Kerns et al.

(10) Patent No.: US 10,435,545 B2
(45) Date of Patent: Oct. 8, 2019

(54) TRIGLYCERIDE CONTAINING SOLUTION POLYMERIZATION PREPARED STYRENE/BUTADIENE ELASTOMER AND TIRE WITH COMPONENT

(71) Applicant: The Goodyear Tire & Rubber Company, Akron, OH (US)

(72) Inventors: Michael Lester Kerns, Medina, OH (US); Stephan Rodewald, Canal Fulton, OH (US); Paul Harry Sandstrom, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 15/353,293

(22) Filed: Nov. 16, 2016

(65) Prior Publication Data

US 2017/0058112 A1 Mar. 2, 2017

Related U.S. Application Data

(63) Continuation-in-part of application No. 13/456,819, filed on Apr. 26, 2012, now abandoned.

(51) Int. Cl.
| | |
|---|---|
| *C08L 9/06* | (2006.01) |
| *B60C 1/00* | (2006.01) |
| *C08F 2/06* | (2006.01) |
| *C08F 236/10* | (2006.01) |

(52) U.S. Cl.
CPC ............... *C08L 9/06* (2013.01); *B60C 1/00* (2013.01); *C08F 2/06* (2013.01); *C08F 236/10* (2013.01); *C08L 2205/06* (2013.01)

(58) Field of Classification Search
CPC ...... C08L 9/00; C08L 236/10; C08L 2205/06; C08L 9/06; B60C 1/00; C08F 2/06; C08F 236/10
USPC .......................................................... 524/413
See application file for complete search history.

(56) References Cited

U.S. PATENT DOCUMENTS

| | | |
|---|---|---|
| 4,367,325 A | 1/1983 | Takeuchi et al. |
| 4,843,120 A | 6/1989 | Halasa et al. |
| 5,047,483 A | 9/1991 | Halasa et al. |
| 5,061,765 A | 10/1991 | Hsu et al. |
| 5,137,998 A | 8/1992 | Hsu et al. |
| 5,239,004 A | 8/1993 | Pyke et al. |
| 5,272,220 A | 12/1993 | Rodger et al. |
| 5,395,891 A | 3/1995 | Obrecht et al. |
| 5,405,927 A | 4/1995 | Hsu et al. |
| 5,620,939 A | 4/1997 | Halasa et al. |
| 5,627,237 A | 5/1997 | Halasa et al. |
| 5,654,384 A | 8/1997 | Halasa et al. |
| 5,672,639 A | 9/1997 | Corvasce et al. |
| 5,677,402 A | 10/1997 | Halasa et al. |
| 6,103,842 A | 8/2000 | Halasa et al. |
| 6,127,488 A | 10/2000 | Obrecht et al. |
| 6,133,364 A | 10/2000 | Obrecht et al. |
| 6,207,757 B1 | 3/2001 | Obrecht et al. |
| 6,242,534 B1 | 6/2001 | Obrecht et al. |
| 6,372,857 B1 | 4/2002 | Obrecht et al. |
| 6,372,863 B1 | 4/2002 | Kerns et al. |
| 6,448,318 B1 | 9/2002 | Sandstrom |
| 6,559,240 B2 | 5/2003 | Hsu et al. |
| 6,984,687 B2 | 1/2006 | Henning et al. |
| 7,071,251 B2 | 7/2006 | Thielen et al. |
| 7,211,611 B2 | 5/2007 | Wilson, III |
| 7,335,692 B2 | 2/2008 | Vasseur et al. |
| 7,411,018 B2 | 8/2008 | Appel et al. |
| 7,834,074 B2 | 11/2010 | Brunelet et al. |
| 7,919,553 B2 | 4/2011 | Kawasaki et al. |
| 7,964,656 B2 | 6/2011 | Bohm et al. |
| 8,044,118 B2 | 8/2011 | Sakaki et al. |
| 8,022,136 B2 | 9/2011 | Yano et al. |
| 8,100,157 B2 | 1/2012 | Hattori et al. |
| 2005/0145312 A1 | 7/2005 | Herberger, Sr. et al. |
| 2007/0135533 A1 | 6/2007 | Bohm et al. |
| 2009/0048400 A1 | 2/2009 | Jung et al. |
| 2010/0063202 A1 | 3/2010 | Halasa et al. |

FOREIGN PATENT DOCUMENTS

| | | | |
|---|---|---|---|
| EP | 1544243 | 6/2005 | |
| EP | 1840161 A1 * | 10/2007 | ............... C08C 1/14 |
| EP | 2028022 | 2/2009 | |
| JP | 07292161 | 4/1994 | |
| JP | 2006/213889 | 8/2006 | |
| JP | 2010/53282 | 3/2010 | |
| JP | 2012/012458 | 1/2012 | |
| KR | 2002064038 A * | 8/2002 | |

OTHER PUBLICATIONS

KR 2002064038 A, machine translation, KIPO Korean Intellectual Property Rights Service (KIPRIS). (Year: 2002).*
Jayewardhana et al., Study on Natural Oils as Alternative Processing Aids and Activators in Carbon Black Filled Natural Rubber, Research Article, May 15, 2009, pp. 187-193, 37 (3), Journal of National Science Foundation Sri Lanka.
S. Dasgupta, et al., Eco-Friendly Processing Oils: A New Tool to Achieve the Improved Mileage in Tyre Tread, Polymer Testing, Dec. 18, 2008, pp. 251-263, Elsevier Ltd.
Sonia Mullally, Sunflower Oil Hits the Road, Nov. 2010, National Sunflower Association.
Steve Laferre, Secrets of Winter Tires, Jul. 9, 2004, Tire Review Magazine.
Steven Ashley, Tire Makers Try Treading Lightly on the Environment, Aug. 11, 2010, Scientific American.
ULTRASIL® VN3GR, Product Information Sheet, Evonik Resource Efficiency GmbH, Jul. 2016, pp. 1-2.

* cited by examiner

*Primary Examiner* — Josephine L Chang
(74) *Attorney, Agent, or Firm* — Alivin T. Rockhill

(57) ABSTRACT

This invention relates to vegetable oil extended rubber containing soy oil and tire with a component of such oil extended rubber.

19 Claims, No Drawings

TRIGLYCERIDE CONTAINING SOLUTION POLYMERIZATION PREPARED STYRENE/BUTADIENE ELASTOMER AND TIRE WITH COMPONENT

This is a continuation-in-part of U.S. patent application Ser. No. 13/456,819, filed on Apr. 26, 2012. The teachings of U.S. patent application Ser. No. 13/456,819 are incorporated by reference herein in their entirety except for references to the temperature at which Mooney viscosities were determined.

FIELD OF THE INVENTION

This invention relates to preparation of triglyceride extended organic solvent solution polymerization prepared styrene/butadiene elastomer, particularly a high molecular weight (high Mooney viscosity) uncured styrene/butadiene elastomer, the resulting composite, rubber composition containing such composite and tire with component containing such rubber composition. Representative of such triglycerides are vegetable oils such as, for example, soybean oil, sunflower oil, rapeseed oil and canola oil.

BACKGROUND OF THE INVENTION

Significantly high molecular weight uncured elastomers (e.g. uncured elastomers of significantly high viscosity) are sometimes desired to prepare rubber compositions to achieve desired physical properties for cured rubber compositions, particularly for various vehicular tire components such as, for tire treads.

It is the organic solution polymerization prepared styrene/butadiene elastomers (SSBRs) that can achieve a desired high molecular weight (high Mooney viscosity) usually considered necessary to promote exceptional physical properties for the cured elastomer, particularly for use for various tire components, particularly tire treads.

However, accompanying the desired high molecular weight of the SSBRs is the significant increase in difficulty in processing the uncured elastomers both at the elastomer production facility, particularly for the finishing of the elastomer, and, also for the preparation of rubber compositions for use as, for example, various components of a tire because of the high Mooney viscosity of the uncured elastomer.

Therefore, such relatively high viscosity SSBRs are sometimes petroleum oil extended at the SSBR manufacturing facility to thereby reduce their viscosity and promote better elastomer processing at the SSBR manufacturing facility. Such SSBRs are often referred to as being oil extended SSBRs, namely petroleum oil extended. Exemplary of such petroleum based rubber processing oils are, for example, aromatic, naphthenic and paraffinic based oils, particularly their mixtures.

Accordingly, it is desired to evaluate whether addition of triglyceride based vegetable oils, instead of petroleum based oils could be used for suitably extending solvent solution prepared styrene/butadiene elastomers (SSBRs), particularly the high molecular weight (e.g. high Mooney viscosity) SSBRs.

Interestingly, it has been observed in such evaluation that use of a triglyceride based vegetable oil such as, for example, soybean oil extended organic solvent solution prepared styrene/butadiene elastomers having a relative high viscosity (Mooney viscosity) resulted in significantly lower viscosity for such uncured styrene/butadiene elastomer (SSBR) than a petroleum oil extended SSBR to thereby enable processing of an even higher molecular weight (even higher Mooney viscosity) SSBR. It is considered that such obtained lower viscosity for the uncured SSBR is both significantly advantageous and appeared to be essential to enable suitable processing for the SSBR at both the rubber manufacturing facility and at a rubber composition preparation facility.

Accordingly, it has been discovered that use of soybean oil instead of petroleum oil has resulted in better processing of a higher viscosity SSBR to promote better physical properties for the rubber composition containing such soybean oil extended SSBR.

Historically, a vegetable oil such as for example soybean oil, or soy oil, has been used for mixing with various rubber compositions by free oil addition to the rubber composition rather than soy oil extension of the elastomer at its point of manufacture. For example, and not intended to be limiting, see U.S. Pat. Nos. 7,919,553, 8,100,157 and 8,022,136. Soybean oil has also been used for oil extending emulsion polymerized elastomers for some circumstances. For example, see U.S. Pat. No. 8,044,118.

However, for this invention, it is desired to evaluate use of triglyceride based vegetable oils such as for example, soybean oil, for extending organic solvent solution polymerization prepared styrene/butadiene copolymer elastomers, particularly high molecular weight elastomers, during their manufacture.

For such evaluation, it is important to appreciate that various vegetable oils, including soybean oil, differ significantly from petroleum based oils, particularly where such vegetable oils are triglycerides which contain a significant degree of unsaturation and clearly not a linear or an aromatic petroleum based oil. Addition of such triglyceride to a cement of a freshly made SSBR contained in its solvent of preparation is considered herein as being of a speculative benefit without trial and evaluation.

The triglyceride(s) for vegetable oils such as, for example, soybean oil, sunflower oil and canola oil are in a form of esters containing a degree of unsaturation. Therefore, use of such triglyceride(s) containing a degree of unsaturation for treatment of a SSBR in its cement composed of the SSBR and organic solvent might be expected to promote a very different oil extended SSBR effect than use of petroleum based oil elastomer for such purpose which may necessitate modifications, hopefully beneficial modifications, of SSBR processing at the SSBR manufacturing facility and at the rubber composition preparation facility.

The following Table A is presented to provide a general illustration of relative saturated, mono unsaturated and polyunsaturated contents of various vegetable oils (triglyceride oils).

TABLE A

| Vegetable Oil | Percent Saturated | Percent Mono Unsaturated | Percent Poly Unsaturated |
| --- | --- | --- | --- |
| Soybean | 16 | 23 | 58 |
| Sunflower | 10 | 45 | 40 |
| Canola (Rapeseed) | 7 | 63 | 28 |
| Corn | 13 | 28 | 55 |
| Coconut | 87 | 6 | 2 |
| Cottonseed | 26 | 18 | 52 |
| Olive | 14 | 73 | 11 |
| Palm | 49 | 37 | 9 |
| Peanut | 17 | 46 | 32 |
| Safflower | 10 | 45 | 40 |

Therefore, such use of vegetable oils for extending the SSBR in its solvent cement form may present requirements for potential modifications of sulfur cure packages for the vegetable oil extended SSBR because of additional unsaturation being present in the triglyceride oil as well as potentially presenting a different array of sulfur cured rubber physical properties for consideration when used with various rubber compositions for tire components as compared to petroleum based oil extended synthetic rubbers.

Such challenges are to be evaluated for triglyceride treatment of SSBR containing cement with results being unknown until the evaluation is undertaken.

In the description of this invention, the terms "compounded" rubber compositions and "compounds"; where used refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

SUMMARY AND PRACTICE OF THE INVENTION

The invention is directed to a triglyceride extending a styrene/butadiene elastomer (SSBR) in its solvent-containing cement, and thereby before recovery of the SSBR, particularly a cement resulting from solvent solution prepared polymerization of styrene and 1,3-butadiene monomers.

In accordance with this invention, a method of preparing a triglyceride extended organic solution polymerization prepared styrene/butadiene elastomer comprises, based on parts by weight per 100 parts by weight of elastomer (phr):

(A) anionically initiating polymerization of monomers comprised of styrene and 1,3-butadiene in an organic solvent solution to form a synthetic styrene/butadiene elastomer (SSBR) contained in a cement comprised of said SSBR and solvent;

(B) terminating said polymerization of said monomers in said cement;

(C) blending from about 5 to about 60, alternately from about 10 to about 40, phr of triglyceride vegetable oils (other than petroleum based oil), and (D) recovering said SSBR as a composite of said SSBR and said triglyceride.

Representative of such triglyceride vegetable oils are, for example, at least one of soybean, sunflower, canola (rapeseed), corn, coconut, cottonseed, olive, palm, peanut, and safflower oils. Usually at least one of soybean, sunflower, canola and corn oil is desired.

In further accordance with this invention, a composite of a triglyceride containing SSBR prepared by such method is provided.

In additional accordance with this invention a composite of a triglyceride containing tin or silicon coupled SSBR composite prepared by such method is provided.

In additional accordance with this invention a composite of a triglyceride containing SSBR containing at least one functional group prepared by such method is provided.

In further accordance with this invention, a rubber composition containing at least one of said SSBR composites is provided.

In further accordance with this invention, a rubber composition containing said SSBR composite is provided which further contains an additive to the rubber composition comprised of at least one of triglyceride oil and petroleum based oil (in addition to the triglyceride oil contained in said SSBR composite). Such additional triglyceride oil and/or petroleum based oil is therefore added to the rubber composition itself instead of selective addition to the SSBR. Such additional triglyceride oil may be comprised of, for example, at least one of said triglyceride oils such as, for example, at least one of soybean oil, sunflower oil, corn oil and canola oil.

In additional accordance with this invention, an article of manufacture, such as for example a tire, is provided having a component comprised of such rubber composition.

In one embodiment of said method, said SSBR, (in a form of a high molecular weight SSBR) (in the absence of solvent and triglyceride), has a Mooney ML 1+4 viscosity (as determined at 100° C.) in a range of from about 50 to about 180, alternately from about 80 to about 120. It is recognized that a high viscosity of the SSBR above 80 (Mooney ML 1+4 viscosity at 100° C.) and particularly above 100, would provide significant processing difficulties for the SSBR.

It is appreciated that the above mentioned high Mooney ML 1+4 viscosity at 100° C. of 80 or above, particularly of 100 or above is evidentiary of a relatively high molecular weight of the SSBR.

In one embodiment of said method, said triglyceride oil extended composite of SSBR (in the absence of said solvent) has a significantly reduced Mooney ML 1+4 viscosity at 100° C. in a range of, for example, and depending upon the Mooney viscosity of the SSBR itself, from about 25 to about 85 to present a more beneficially processable SSBR composite.

In one embodiment, said triglycerides are composed of a mixture of naturally occurring triglycerides recovered from, for example soybeans, composed of at least one of, usually at least three of glycerol tri-esters of at least one and usually at least three unsaturated fatty acids. Such fatty acids are typically primarily comprised of, for example, of at least one of linolenic acid, linoleic acid, and oleic acid.

For example, such combination of unsaturated fatty acids may be comprised of a blend of:

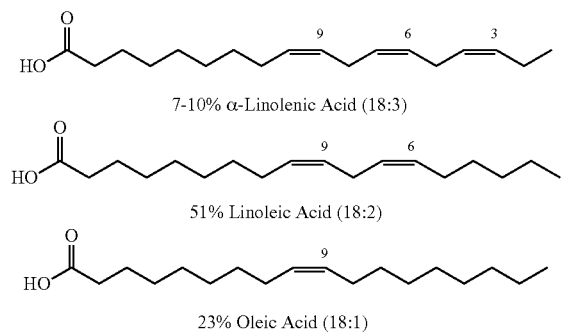

In the case of soybean oil, for example, the above represented percent distribution, or combination, of the fatty acids for the glycerol tri-esters, namely the triglycerides, is represented as being an average value and may vary somewhat depending primarily on the type, or source of the soybean crop, and may also depend on the growing conditions of a particular soybean crop from which the soybean oil was obtained. There are also significant amounts of other saturated fatty acids typically present, though these usually do not exceed 20 percent of the soybean oil.

In one embodiment, the SSBR may be a tin or silicon coupled elastomer.

In one embodiment, the SSBR may be a functionalized SSBR containing, for example, at least one functional group comprised of amine, siloxy, carboxyl and hydroxyl groups, particularly functional groups. Such functional groups may be reactive with, for example, silanol groups on a synthetic amorphous silica such as, for example, a precipitated silica.

In one embodiment, the SSBR is a tin or silicon coupled SSBR containing, for example, at least one functional group comprised of amine, siloxy, carboxyl and hydroxyl groups. Such functional groups may be for example reactive with, for example, silanol groups on a synthetic amorphous silica such as, for example, a precipitated silica.

The anionic polymerizations employed in making such SSBR in the organic solvent solution are typically initiated by adding an organolithium initiator to an organic solution polymerization medium which contains the styrene and 1,3-butadiene monomers. Such polymerizations are typically carried out utilizing continuous or batch polymerization techniques. In such continuous polymerizations, monomers and initiator are continuously added to the organic solvent polymerization medium with the synthesized rubbery styrene/butadiene elastomer (SSBR) being continuously withdrawn in its organic solvent solution as a cement thereof. Such continuous polymerizations are typically conducted in a multiple reactor system.

Suitable polymerization methods are known in the art, for example, and without an intended limitation, as disclosed in one or more U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240; all of which are fully incorporated herein by reference.

The SSBRs of the present invention are produced by anionic initiated polymerization employing an organo alkali metal compound, usually an organo monolithium compound, as an initiator. The first step of the process involves contacting the combination of styrene and 1,3-butadiene monomer(s) to be polymerized with the organo monolithium compound (initiator) in the presence of an inert diluent, or solvent, thereby forming a living polymer compound having the simplified structure A-Li. The monomers may be a vinyl aromatic hydrocarbon such as the styrene and a conjugated diene such as the 1,3-butadiene. Styrene is the preferred vinyl aromatic hydrocarbon and the preferred diene is 1,3-butadiene.

The inert diluent may be an aromatic or naphthenic hydrocarbon, e.g., benzene or cyclohexane, which may be modified by the presence of an alkene or alkane such as pentenes or pentanes. Specific examples of other suitable diluents include n-pentane, hexane such as for example n-hexane, isoctane, cyclohexane, toluene, benzene, xylene and the like. The organomonolithium compounds (initiators) that are reacted with the polymerizable additive in this invention are represented by the formula a RLi, wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyl-lithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyl-lithium, and the like. The alkyllithium compounds are preferred for employment according to this invention, especially those wherein the alkyl group contains from 3 to 10 carbon atoms. A much preferred initiator is n-butyllithium.

The amount of organolithium initiator to effect the anionically initiated polymerization will vary with the monomer(s) being polymerized and with the molecular weight that is desired for the polymer being synthesized. However, generally, from 0.01 to 1 phm (parts per 100 parts by weight of monomer) of an organolithium initiator will be often be utilized. In many cases, from 0.01 to 0.1 phm of an organolithium initiator will be utilized with it often being more desirable to utilize 0.025 to 0.07 phm of the organolithium initiator.

The polymerization temperature utilized can vary over a broad range such as, for example, from about −20° C. to about 180° C. However, often a polymerization temperature within a range of about 30° C. to about 125° C. will be desired. It is often typically desired for the polymerization temperature to be within a more narrow range of about 45° C. to about 100° C. or within a range of from about 60° C. to about 85° C. The pressure used for the polymerization reaction, where applicable, will normally be sufficient to maintain a substantially liquid phase under the conditions of the polymerization reaction.

The SSBRs prepared in the organic solution by the anionically initiated polymerization may be coupled with a suitable coupling agent, such as a tin halide or a silicon halide, to improve desired physical properties by increasing their molecular weight with a usual increase in their viscosity (e.g. Mooney viscosity of the uncured SSBR). Tin-coupled styrene/butadiene polymers have been observed to improve tire treadwear and to reduce tire rolling resistance when used in tire tread rubbers. Such tin-coupled SSBRs are typically made by coupling the SSBR with a tin coupling agent at or near the end of the polymerization used in synthesizing the SSBR. In the coupling process, live polymer chain ends react with the tin coupling agent, thereby coupling the SSBR. For example, up to four live chain ends can react with tin tetrahalides, such as tin tetrachloride, thereby coupling the polymer chains together.

The coupling efficiency of the tin coupling agent is dependant on many factors, such as the quantity of live chain ends available for coupling and the quantity and type of polar modifier, if any, employed in the polymerization. For instance, tin coupling agents are generally not as effective in the presence of polar modifiers. However, polar modifiers such as tetramethylethylenediamine, are frequently used to increase the glass transition temperature of the rubber for improved properties, such as improved traction characteristics in tire tread compounds. Coupling reactions that are carried out in the presence of polar modifiers typically have a coupling efficiency of about 50-60% in batch processes.

In cases where the SSBR will be used in rubber compositions that are loaded primarily with carbon black reinforcement, the coupling agent for preparing the elastomer may typically be a tin halide. The tin halide will normally be a tin tetrahalide, such as tin tetrachloride, tin tetrabromide, tin tetrafluoride or tin tetraiodide. However, mono-alkyl tin trihalides can also optionally be used. Polymers coupled with mono-alkyl tin trihalides have a maximum of three arms. This is, of course, in contrast to SSBRs coupled with tin tetrahalides which have a maximum of four arms. To induce a higher level of branching, tin tetrahalides are normally preferred. As a general rule, tin tetrachloride is usually the most preferred.

In cases where the SSBR will be used in compounds that are loaded with high levels of silica, the coupling agent for preparing the SSBR will typically be a silicon halide. The silicon-coupling agents that can be used will normally be silicon tetrahalides, such as silicon tetrachloride, silicon tetrabromide, silicon tetrafluoride or silicon tetraiodide. However, mono-alkyl silicon trihalides can also optionally be used. SSBRs coupled with silicon trihalides have a maximum of three arms. This is, of course, in contrast to SSBRs coupled with silicon tetrahalides during their manufacture which have a maximum of four arms. To induce a higher level of branching, if desired, of the SSBR during its manufacture, silicon tetrahalides are normally preferred. In general, silicon tetrachloride is usually the most desirable of the silicon-coupling agents for such purpose.

In one embodiment, various organic solvents may be used for the polymerization medium which are relatively inert to the polymerization reaction such as for example, the aforesaid n-pentane, n-hexane, isooctane, cyclohexane, toluene, benzene, xylene and the like, (exclusive, of course, of water based emulsifier containing liquid mediums). Solvent removal from the polymerizate, or cement, may be accomplished using one or more of the methods as are known in the art, including but not limited to precipitation, steam stripping, filtration, centrifugation, drying and the like.

The recovered triglyceride oil extended SSBR may be compounded (blended) into a vulcanizable (sulfur vulcanizable) rubber composition which may, and will usually, include other elastomers, particularly sulfur curable diene-based elastomers, as is well known to those familiar with such art. The phrase "sulfur curable rubber" or elastomer such as "diene-based elastomers" is intended to include both natural rubber and its various raw and reclaim forms as well as various synthetic rubbers including the SSBR used in the practice of this invention.

In further accordance with this invention, a rubber composition is provided comprised of said triglyceride oil extended SSBR.

In additional accordance with this invention, a rubber composition is provided comprised of, based upon parts by weight per 100 parts by weight rubber (phr):
  (A) conjugated diene-based elastomers comprised of:
    (1) about 70 to about 100, alternately from about 50 to about 80, phr of triglyceride oil extended SSBR (according to this invention), and correspondingly
    (2) from about zero to about 30, alternately from about 20 to about 50, phr of at least one additional elastomer comprised of at least one of polymers of at least one of isoprene and 1,3-butadiene and copolymers of styrene and at least one of isoprene and 1,3-butadiene (in addition to and therefore other than said triglyceride oil extended SSBR);
  (B) about 40 to about 110, alternately from about 50 to about 80, phr of reinforcing filler comprised of:
    (1) amorphous synthetic silica (e.g. precipitated silica), or
    (2) rubber reinforcing carbon black, or
    (3) combination of precipitated silica and rubber reinforcing carbon black (containing, for example, about 20 to about 90 weight percent of precipitated silica, alternately from about 55 to about 90 weight percent precipitated silica for silica-rich reinforcing filler and alternately from about 20 to about 45 weight percent precipitated silica for a carbon black-rich reinforcing filler);
  (C) silica coupling agent (for said precipitated silica where said reinforcing filler contains precipitated silica) having a moiety reactive with hydroxyl groups (e.g. silanol groups) on said precipitated silica and another different moiety interactive with carbon-to-carbon double bonds of said conjugated diene-based elastomers (including said SSBR).

In further accordance with this invention a tire is provided which contains at least one component comprised of said rubber composition.

Representative examples of said additional rubbers, or elastomers, are, for example, cis 1,4-polyisoprene, cis 1,4-polybutadiene, isoprene/butadiene, styrene/isoprene, styrene/butadiene and styrene/isoprene/butadiene elastomers. Additional examples of elastomers which may be used include 3,4-polyisoprene rubber, carboxylated rubber, silicon-coupled and tin-coupled star-branched elastomers. Often desired rubber or elastomers are cis 1,4-polybutadiene, styrene/butadiene rubber and cis 1,4-polyisorprene rubber.

Such precipitated silicas may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the Journal of the American Chemical Society, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

The conventional precipitated silica might be expected to have an average ultimate particle size, for example, in the range of 0.01 to 0.05 micron as determined by the electron microscope, although the silica particles may be even smaller, or possibly larger, in size.

Various commercially available precipitated silicas may be used, such as, only for example herein, and without limitation, silicas from PPG Industries under the Hi-Sil trademark with designations 210, 243, etc; silicas from Rhodia, with, for example, designations of Z1165MP and Z165GR, silicas from Evonic with, for example, designations VN2 and VN3 and chemically treated precipitated silicas such as for example Agilon™ 400 from PPG.

Representative examples of rubber reinforcing carbon blacks are, for example, and not intended to be limiting, those with ASTM designations of N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. Such rubber reinforcing carbon blacks may have iodine absorptions ranging from, for example, 9 to 145 g/kg and DBP numbers ranging from 34 to 150 cc/100 g.

Other fillers may be used in the vulcanizable rubber composition including, but not limited to, particulate fillers including ultra high molecular weight polyethylene (UHM-WPE); particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639. One or more other fillers may be used in an amount ranging from about 1 to about 20 phr.

It may be desired for the precipitated silica-containing rubber composition to contain a silica coupling agent for the silica comprised of, for example,
  (A) bis(3-trialkoxysilylalkyl) polysulfide containing an average in range of from about 2 to about 4 sulfur atoms in its connecting bridge, or (B) an organoalkoxymercaptosilane, or
(C) their combination.

Representative of such bis(3-trialkoxysilylalkyl) polysulfide is comprised of bis(3-triethoxysilylpropyl)polysulfide.

It is readily understood by those having skill in the art that the vulcanizable rubber composition would be compounded by methods generally known in the rubber compounding art, such as, for example, mixing various additional sulfur-vulcanizable elastomers with said SSBR composite and various commonly used additive materials such as, for example, sulfur and sulfur donor curatives, sulfur vulcanization curing aids, such as activators and retarders and processing additives, resins including tackifying resins and plasticizers, petroleum based or derived process oils as well as triclycerides in addition to said triglyceride extended SSBR, fillers such as rubber reinforcing fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of tackifier resins, if used, may comprise, for example, about 0.5 to about 10 phr, usually about 1 to about 5 phr. Typical amounts of processing aids comprise about 1 to about 50 phr. Additional process oils, if desired, may be added during compounding in the vulcanizable rubber composition in addition to the extending triglyceride oil contained in the triglyceride extended SSBR. The additional petroleum based or derived oils may include, for example, aromatic, paraffinic, napthenic, and low PCA oils such as MEW, TDAE, and heavy napthenic, although low PCA oils might be preferred. Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Often desirably the primary accelerator is a sulfenamide. If a second accelerator is used, the secondary accelerator is often desirably a guanidine such as for example a diphenylguanidine, a dithiocarbamate or a thiuram compound.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The vulcanizable rubber composition containing the triglyceride oil extended SSBR may be incorporated in a variety of rubber components of an article of manufacture such as, for example, a tire. For example, the rubber component for the tire may be a tread (including one or more of a tread cap and tread base), sidewall, apex, chafer, sidewall insert, wirecoat or innerliner.

The pneumatic tire of the present invention may be a race tire, passenger tire, aircraft tire, agricultural, earthmover, off-the-road, truck tire and the like. Usually desirably the tire is a passenger or truck tire. The tire may also be a radial or bias ply tire, with a radial ply tire being usually desired.

Vulcanization of the pneumatic tire of the present invention is generally carried out at conventional temperatures in a range of, for example, from about 140° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts and percentages are parts by weight, usually parts by weight per 100 parts by weight rubber (phr) unless otherwise indicated.

EXAMPLE I

In this example, the effect of triglyceride oil, namely soybean oil, extending and of petroleum oil extending an anionically initiated organic solution polymerization of styrene and 1,3-butadiene monomers to prepare a styrene/ butadiene elastomer (SSBR, an abbreviation for such solution polymerization prepared styrene/butadiene rubber) is demonstrated.

Preparation of the Base SSBR

An ionically initiated polymerization reaction was conducted in a 2000 liter reactor equipped with external heating/cooling jacket, and external agitator. The reactor temperature was controlled in the range of about 63° C. to about 71° C. throughout the reaction run time while the internal pressure ranged from about 97 to about 186 kPa.

A hexane solution containing 12 weight percent total monomers (composed of 70 weight percent 1,3-butadiene and 30 weight percent styrene) in hexane was charged into the reactor. TMEDA (Tetramethylethylenediamine, 0.12 pphm) was added through a dip tube into the reactor followed by SMT (sodium mentholate, 0.0035 pphm). After reaching the prescribed temperature, the anionic polymerization initiator, n-BuLi (n-butyllithium 1.6 M in hexane, 0.025 pphm) was then added to the reactor. Upon achieving an acceptable conversion of the monomers (90 to 95 percent), the resulting elastomer cement comprised of the styrene/butadiene elastomer and hexane solvent was transferred into a 2000 liter tank, where a polymerization termination agent (Polystay K, 0.5 pphm) was added.

Microstructure analysis of the recovered SSBR elastomer gave bound styrene=31.7 weight percent, and an olefin microstructure distribution of vinyl=63.5 percent, cis=21.4 percent, and trans=15.1 percent.

The Mooney viscosity (100° C.), ML(1+4) of the recovered SSBR was about 107.

Petroleum Oil Extension of Base SSBR; Preparation of Polymer X

The base SSBR (102 kg), still contained in its cement and therefore containing the reaction solvent, namely the hexane, was blended with petroleum oil in a form of naphthenic oil (obtained as Ergon™ L2000), in an amount of 36.8 pphr, (or parts by weight per hundred parts of the elastomer). The final blend was finished by steam stripping in a 400 liter stripper to remove the solvent. The wet recovered SSBR composite was removed from the stripper and dried through an expeller. The collected styrene/butadiene elastomer composite was placed in an oven for drying.

The Mooney viscosity (100° C.), ML(1+4) of the recovered SSBR composite (Polymer X) had a significantly reduced value of about 52.8.

Triglyceride (Soybean Oil) Extension of Base SSBR; Preparation of Polymer Y

The same procedure used for preparation of Polymer X, was also followed for the triglyceride oil extension with soybean oil. In this case 102 kg of the base SSBR was mixed with soybean oil (36.9 pphr).

The Mooney viscosity (100° C.), ML(1+4) of the recovered SSBR composite (Polymer Y) had a significantly reduced value of about 40 which, in addition, was very significantly below the Mooney viscosity of 52.8 obtained for the petroleum oil extended SSBR.

Accordingly, although the mechanism might not be fully understood, it is concluded that a significant and beneficial discovery was made with the soybean oil extension of the SSBR by finishing the preparation of the SSBR with the inclusion of the soybean oil in the solvent-containing SSBR cement which significantly and beneficially enabled a greater reduction of the recovered SSBRs Mooney viscosity than the petroleum oil inclusion which thereby beneficially enabled an improved processing of the SSBR composite (Polymer Y) at the SSBR production facility as well as the SSBR compounding facility.

EXAMPLE II

Experiments were conducted to evaluate the effect of employing the petroleum oil extended elastomer (SSBR), namely Polymer X and triglyceride oil (soybean oil) extended elastomer (SSBR), namely Polymer Y, of Example I in a rubber composition which contained carbon black reinforcement.

Rubber compositions identified herein as Control rubber Sample A and Experimental rubber Sample B were prepared and evaluated.

Control rubber Sample A contained the petroleum based oil extended SSBR, namely Polymer X.

Experimental rubber Sample B contained the triglyceride oil (soybean oil) extended SSBR of Example I, namely Polymer Y.

The rubber Samples were prepared by mixing the elastomers with reinforcing filler as rubber reinforcing carbon black without precipitated silica together in a first non-productive mixing stage (NP1) in an internal rubber mixer for about 4 minutes to a temperature of about 160° C. The resulting mixture was subsequently mixed in a second sequential non-productive mixing stage (NP2) in an internal rubber mixer to a temperature of about 160° C. with no additional ingredients added. The rubber composition was subsequently mixed in a productive mixing stage (P) in an internal rubber mixer with a sulfur cure package, namely sulfur and sulfur cure accelerator(s), for about 2 minutes to a temperature of about 115° C. The rubber composition is removed from its internal mixer after each mixing step and cooled to below 40° C. between each individual non-productive mixing stage and before the final productive mixing stage.

The basic formulation for the Control rubber Sample A and Experimental rubber Sample B is presented in the following Table 1 expressed in parts by weight per 100 parts of rubber (phr) unless otherwise indicated.

TABLE 1

|  | Parts by weight (phr) |
| --- | --- |
| Non-Productive Mixing Stage (NP) |  |
| Petroleum oil extended SSBR (Polymer X)[1] | 75 or 0, with 28.12 parts oil |
| Soybean oil extended SSBR (Polymer Y)[2] | 0 or 75, with 28.12 parts oil |
| Cis 1,4-polybutadiene elastomer[3] | 25 |
| Carbon black[4] | 73 |
| Wax, microcrystalline | 3.8 |
| Zinc oxide | 1.8 |
| Fatty acid[5] | 2 |
| Processing oil, petroleum derived (naphthenic) | 12 |
| Productive Mixing Stage (P) |  |
| Sulfur | 1.6 |
| Sulfur cure accelerator(s)[6] | 1.8 |
| Antioxidant | 1.2 |

[1]Solution polymerization prepared styrene/butadiene rubber (SSBR) composite as Polymer X illustrated in Example I having about 30 percent bound styrene, 41 percent vinyl content for its butadiene portion and, for this Example, containing 37.5 parts rubber processing petroleum based naphthenic oil per 100 parts rubber and reported in the Table as parts by weight of the SSBR itself.
[2]Solution polymerization prepared styrene/butadiene rubber (SSBR) composite as Polymer Y illustrated in Example I having about 30 percent bound styrene, 41 percent vinyl content for its butadiene portion and, for this Example, containing 37.5 parts soybean oil per 100 parts rubber and reported in the Table as parts by weight of the SSBR itself.
[3]Cis 1,4-polybutadiene rubber as BUD1207 ™ from The Goodyear Tire & Rubber Company
[4]N299 rubber reinforcing carbon black, ASTM identification
[5]Primarily comprised of stearic, palmitic and oleic acids
[6]Sulfenamide and diphenylguanidine accelerators The following Table 2 illustrates cure behavior and various physical properties of rubber compositions based upon the basic recipe of Table 1 and reported herein as a Control rubber Sample A and Experimental rubber Sample B. Where cured rubber samples are examined, such as for the stress-strain, hot rebound and hardness values, the rubber samples were cured for about 14 minutes at a temperature of about 160° C.

TABLE 2

| | Samples | |
| --- | --- | --- |
| | Control A | Experimental B |
| Materials (phr) | | |
| Petroleum based oil extended SSBR (Polymer X) | 75 | 0 |
| Soybean oil extended SSBR (Polymer Y) | 0 | 75 |
| Cis 1,4-polybutadiene rubber | 25 | 25 |
| Properties | | |
| RPA[1] (100° C.), Storage Modulus G', MPa | | |
| Uncured G' 15% strain, 0.83 Hertz (kPa) | 221 | 187 |
| Cured G' modulus, 10% strain, 11 Hertz (kPa) | 2798 | 2081 |
| Tan delta at 10% strain, (kPa) | 0.193 | 0.207 |
| Rheometer (160° C.) | | |
| T90 | 6 | 5.1 |
| Delta torque | 15.4 | 12.2 |
| Stress-strain, ATS[2], 14 min, 160° C. | | |
| Tensile strength (MPa) | 15.4 | 14.9 |
| Elongation at break (%) | 425 | 590 |
| 300% modulus, ring (MPa) | 11.4 | 6.9 |
| Rebound of cured rubber, 100° C. | 52 | 51 |
| Shore A hardness of cured rubber, 100° C. | 57 | 50 |
| Tear strength[3] of cured rubber (N) | 76 | 133 |
| Abrasion rate (mg/km) of cured rubber, (Grosch)[4] | | |
| Medium severity (40 N), 6° slip angle, disk, Speed = 20 km/hr, distance = 1,000 meters | 112 | 67 |

[1]Automated Testing System (ATS) instrument
[2]Rubber Process Analyzer (RPA) instrument
[3]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force (N).
[4]Grosch abrasion rate run on an LAT-100 Abrader measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters.

The results clearly show the improved processing benefit of the soybean oil extended Polymer Y (Rubber Sample B) as compared to the naphthenic oil extended Polymer X (Rubber Sample A)

In particular, it is seen that the significantly lower uncured Modulus G' value of 187 MPa was obtained for Rubber Sample B containing the soybean oil extended SSBR, namely Polymer Y, versus the significantly higher uncured Modulus G' value of 221 MPa obtained for the naphthenic oil extended SBR, namely Polymer X.

This is predictive of significantly better extrusion rates when using rubber Sample B to produce an extruded tread rubber composition.

This is also predictive of an ability to enable use of a significantly increased molecular weight (increased Mooney viscosity) for the SSBR when soybean oil extension is used with an expected useable processing ability for the rubber composition with an enhanced utility of the increased Mooney viscosity of the SSBR to enable beneficially improved hysteresis as well as increased stiffness and abrasion resistance of the resulting rubber composition.

It is also seen that the Rubber Sample B (containing the soybean extended SSBR) exhibited beneficially higher tear strength as compared to Rubber Sample A (containing the naphthenic oil extended SSBR).

The dramatic improvement in reduction of rate of abrasion to a value of only 67 mg/km for Rubber Sample B (containing the soybean extended SSBR) as compared to a much higher rate of abrasion of a value of 112 mg/km for Rubber Sample A (containing the naphthenic oil extended SSBR) was unexpected and is not considered as being readily explainable.

As mentioned, the filler reinforcement for Rubber Samples A and B is rubber reinforcing carbon black and therefore without containing (exclusive of) precipitated silica and silica coupling agent.

EXAMPLE III

Experiments were conducted to evaluate the effect of employing the petroleum based oil extended elastomer (SSBR) and soybean oil extended elastomer (SSBR) of Example I in a rubber composition which contained reinforcing filler as a combination of rubber reinforcing carbon black and precipitated silica so that the reinforcing filler was silica rich, containing 90 phr of the silica and only 16 phr of the carbon black reinforcement.

Rubber compositions identified herein as Control rubber Sample C and Experimental rubber Samples D and E were prepared and evaluated.

Control rubber Sample C contained a petroleum based oil extended SSBR as Polymer X from Example I.

Experimental rubber Sample D contained the soybean oil extended SSBR as Polymer Y of Example I.

Experimental rubber Sample E is similar to Experimental rubber Sample D except that an increase, in an amount of about 20 percent, of sulfur curative content was used for the rubber composition.

The rubber Samples were prepared by mixing the elastomers with reinforcing fillers, namely rubber reinforcing carbon black and precipitated silica together in a first non-productive mixing stage (NP1) in an internal rubber mixer for about 4 minutes to a temperature of about 160° C. The resulting mixture was subsequently mixed in a second sequential non-productive mixing stage (NP2) in an internal rubber mixer to a temperature of about 160° C. with no additional ingredients added. The rubber composition was subsequently mixed in a productive mixing stage (P) in an internal rubber mixer with a sulfur cure package, namely sulfur and sulfur cure accelerator(s), for about 2 minutes to a temperature of about 115° C. The rubber composition is removed from its internal mixer after each mixing step and cooled to below 40° C. between each individual non-productive mixing stage and before the final productive mixing stage.

The basic formulation for the Control rubber Sample C, Experimental rubber Sample D and Experimental rubber Sample E is presented in the following Table 3 expressed in parts by weight per 100 parts of rubber (phr) unless otherwise indicated.

TABLE 3

| | Parts by weight (phr) |
|---|---|
| First Non-Productive Mixing Stage (NP1) | |
| Petroleum oil extended SSBR (Polymer A)[1] | 75 or 0, with 28.12 parts oil |
| Soybean oil extended SSBR (Polymer B)[2] | 0 or 75, with 28.12 parts oil |
| Cis 1,4-polybutadiene elastomer[3] | 25 |
| Precipitated silica[7] | 90 |
| Silica coupler (coupling agent)[8] | 7.2 |
| Carbon black, N121[4] | 16 |
| Wax, microcrystalline | 2 |
| Fatty acid[5] | 3 |
| Processing oil, petroleum derived (naphthenic) | 3 |
| Productive Mixing Stage (P) | |
| Zinc oxide | 2.5 |
| Sulfur | 1.8 |
| Sulfur cure accelerator(s)[6] | 4 |
| Antioxidant | 3 |

[7]Precipitated silica as Zeosil 1165 ™ MP from Rhodia
[8]Silica coupling agent as Si266 ™ from Evonic comprised of a bis(3-triethoxysilylpropyl) polysulfide containing an average in a range of from about 2 to about 2.6 connecting sulfur atoms in its polysulfidic bridge and used without a carbon black carrier.

The following Table 4 illustrates cure behavior and various physical properties of rubber compositions based upon the basic recipe of Table 1 and reported herein as a Control rubber Sample C, Experimental rubber Sample D and Experimental rubber Sample E. Where cured rubber samples are examined, such as for the stress-strain, hot rebound and hardness values, the rubber samples were cured for about 14 minutes at a temperature of about 160° C.

TABLE 4

| | Rubber Samples | | |
|---|---|---|---|
| | Control | Experimental | |
| | C | D | E |
| Materials (phr) | | | |
| Petroleum based oil extended SSBR (Polymer X) | 75 | 0 | 0 |
| Soybean oil extended SSBR (Polymer Y) | 0 | 75 | 75 |
| Cis 1,4-polybutadiene rubber | 25 | 25 | 25 |
| Properties | | | |
| RPA (100° C.), Storage Modulus G', MPa | | | |
| Uncured G' 15% strain, 0.83 Hertz (kPa) | 260 | 252 | 255 |
| Cured G' modulus, 10% strain, 11 Hertz (kPa) | 2181 | 1839 | 1927 |
| Tan delta at 10% strain, (kPa) | 0.168 | 0.182 | 0.174 |
| Rheometer (160° C.) | | | |
| T90 | 16.1 | 16.6 | 12.9 |
| Delta Torque | 19.4 | 15.8 | 16 |
| Stress-strain, ATS, 14 min, 160° C. | | | |
| Tensile strength (MPa) | 16.2 | 16.2 | 15.8 |
| Elongation at break (%) | 386 | 518 | 443 |
| 300% modulus, ring (MPa) | 13.5 | 9.1 | 11.1 |
| Rebound, 100° C. | 53 | 51 | 52 |
| Shore A Hardness, 100° C. | 66 | 61 | 62 |
| Tear strength (N) | 68 | 135 | 88 |
| Abrasion rate (mg/km), (Grosch), high severity (70 N) | 493 | 472 | 482 |

It is seen from Table 4 that the processing of Rubber Sample D containing the soybean oil extended SSBR in terms of its G' modulus of 252 MPa is improved as compared to the G' modulus of 260 for Rubber Sample C containing the naphthenic oil extended SSBR, the processing advantage is less, in terms of the comparative G' modulus values of the Rubber Samples seen in Example II for its Rubber Sample B containing the soybean oil extended SSBR.

In one aspect, Rubber Sample D (containing the soybean oil extended SSBR) in this Example III used a combination of silica and carbon black in a silica-rich reinforcing filler where Rubber Sample B (containing the soybean oil extended SSBR) in the previous Example II used rubber reinforcing carbon black as the reinforcing filler without the silica.

However, it is seen in Rubber Sample E that a small adjustment in the curative content in the rubber Sample (about a 20 percent increase was used) to better match physical properties of the naphthenic oil extended SSBR of the Control Rubber Sample E, allows a fairly good match of many of indicated cured rubber properties.

The cure adjusted rubber Sample E using the soybean oil extended SSBR also still exhibits improved tear strength (resistance to tear) and abrasion resistance when compared to the Control rubber Sample C using the naphthenic oil extended SSBR.

The results of these two Examples, II and III, suggest that the soybean oil extension of the SSBR can reduce viscosity (Mooney viscosity) of the rubber composition and improve its abrasion resistance when used as a replacement for conventional rubber processing petroleum oil, particularly in the rubber composition containing carbon black as the reinforcing filler.

EXAMPLE IV

In this example, two SSBR (styrene-butadiene rubber made by solution polymerization) samples were prepared for a comparative study in a compounding recipe wherein the one SSBR was finished after polymerization without addition of any oil and used in the compounding recipe, whereas the second SSBR was extended with 20 phr soybean oil. The first non-oil extended SSBR (AA) had a Mooney ML 1+4 viscosity at 100° C. of 82. This is typically considered to be the maximum viscosity at which a non-oil extended SSBR can be synthesized by polymerization and then processed with conventional polymer equipment used in commercial production plants to produce a coagulated and dried rubber. Higher Mooney viscosity results in much higher temperatures generated in the finishing and drying process. The second polymer (BB) had a Mooney ML 1+4 viscosity at 100° C. of greater than 140 and would not be capable of being processed in conventional polymer plant equipment to attain a commercially viable finished product. The SSBR was oil extended with 20 phr of soybean oil and then had a final Mooney ML 1+4 viscosity at 100° C. of 76 and was capable of being processed in conventional polymer plant equipment to attain a dried final product. The preparation or polymerization process was similar to the preparations of Polymers X and Y from the previous examples.

Microstructure analysis of the recovered SSBR AA showed a bound styrene content of 33.5 weight percent and a vinyl microstructure content of 36.7 weight percent. The recovered SSBR BB has a bound styrene content of 34.5 weight percent and a vinyl content of 37.8 weight percent.

Experiments were conducted to evaluate the effect of adding soybean oil to the Banbury mixing step for the non-oil extended polymer AA in comparison to using polymer BB which was produced with a higher molecular weight polymer and then soybean oil extended to produce a lower viscosity oil-extended polymer, having a Mooney viscosity which was similar to that of non-oil extended Polymer AA. Keeping macro structural characteristics such as the degree of branching constant, Mooney viscosity is directly correlated to the molecular weight of the polymer.

Rubber compositions identified herein as rubber experimental rubber Sample F and Experimental rubber Sample G were prepared and evaluated. Experimental rubber Sample F contained the non- oil extended SSBR AA and experimental Sample G contained the soybean oil extended Polymer BB.

The rubber Samples were prepared by mixing the elastomers with silica reinforcing filler and a minor amount of carbon black. All materials were added during a first non-productive mixing stage (NP1) in an internal rubber mixer for about 4 minutes to a temperature of about 160° C. and a second sequential non-productive mixing stage (NP2) in an internal rubber mixer to a temperature of about 160° C. and a third non-productive mixing stage (NP3) was conducted with no additional ingredients added. The rubber compositions were subsequently mixed in a productive mixing stage (P) in an internal rubber mixer with a sulfur cure package, namely sulfur and sulfur cure accelerator(s), for about 2 minutes to a temperature of about 115° C. The rubber composition is removed from its internal mixer after each mixing step and cooled to below 40° C. between each individual non-productive mixing stage and before the final productive mixing stage.

The basic formulation for the experimental rubber samples F and G is presented in the following Table 5 expressed in parts by weight per 100 parts of rubber (phr) unless otherwise indicated.

TABLE 5

|  | Parts by weight (phr) |
| --- | --- |
| Non-Productive Mixing Stages (NP's) | |
| Non-oil extended SSBR (Polymer AA) | 0 or 85 |
| Soybean oil extended SSBR (Polymer BB)[2] | 0 or 102 |
| Cis 1,4-polybutadiene elastomer[3] | 15 |
| Silica | 85 |
| Coupling agent | 7 |
| Carbon black | 5 |
| Soybean oil | 5 or 22 |
| Zinc oxide | 1.8 |
| Fatty acid | 3 |
| Traction resin | 15 |
| Productive Mixing Stage (P) | |
| Sulfur | 1.7 |
| Sulfur cure accelerator(s) | 4.8 |
| Zinc oxide | 1.8 |

TABLE 6

|  | Samples | |
| --- | --- | --- |
|  | Experimental F | Experimental G |
| Materials (phr) | | |
| Non-oil extended SSBR (Polymer AA) | 85 | 0 |
| Soybean oil extended SSBR (Polymer BB) | 0 | 102* |
| Cis 1,4-polybutadiene rubber | 15 | 15 |
| Soybean oil | 22 | 5 |
| Total soybean oil | 22 | 22 |
| Properties | | |
| RPA[1] (100° C.), Storage Modulus G', MPa | | |
| Uncured G' 15% strain, 0.83 Hertz (kPa) | 186 | 237 |
| Cured G' modulus, 10% strain, 11 Hertz (kPa) | 1391 | 1324 |
| Tan delta at 10% strain, (kPa) | .12 | .12 |
| Rheometer (160° C.) | | |
| T90 | 16 | 14 |
| Delta torque | 13.0 | 11.2 |
| Stress-strain, ATS[2], 14 min, 160° C. | | |
| Tensile strength (MPa) | 15.9 | 17.2 |
| Elongation at break (%) | 505 | 534 |
| 300% modulus, ring (MPa) | 8.9 | 9.0 |
| Rebound of cured rubber, 100° C. | 56 | 61 |

TABLE 6-continued

| | Samples | |
|---|---|---|
| | Experimental F | Experimental G |
| Tear strength[3] of cured rubber (N) | 70 | 97 |
| Abrasion rate (mg/km) of cured rubber, (Grosch)[4] Medium severity (40 N), 6° slip angle, disk, Speed = 20 km/hr, distance = 1,000 meters | 156 | 129 |

*This sample contained 85 parts by weight of SBR which was extended with 17 parts by weight of soybean oil for a total of 102 parts by weight.

The results of this study clearly show the advantage of being able to use a higher Mooney (molecular weight) SSBR in cured rubber compound to improve rebound, tear and abrasion properties when compared to the use of a lower Mooney (molecular weight) polymer of similar microstructure. The use of a soybean oil extended elastomer in a plant production process allows for the production of SBR having a higher (molecular weight) Mooney viscosity. These soybean oil extended elastomers can be used in formulating cured rubber compositions having a highly desirable combination of properties. More specifically, such soybean oil extended SBR exhibits improved performance including better abrasion resistance, better tear strength, and higher rebound. These desirable elastomer characteristics are predictive of beneficially reduced tire treadwear and lower rolling resistance. Due to the highly plasticizing soybean oil being added to the polymer cement prior to finishing at the polymer production facility, SBR having much higher molecular weights than can be normally oil extended can be successfully oil extended with soybean oil to make an elastomer composition having the previously mentioned highly desirable array of properties. This is in contrast to oil extending SBR in a subsequent Banbury mixing step which does not result in the highly desirable array of properties which are attained by originally oil extending the SBR in the solvent utilized in its synthesis. The beneficial combination of properties realized by practicing the subject invention can only be attained by oil extending SBR with a triglyceride oil. This combination of properties cannot be attained utilizing conventional petroleum based rubber extending oils or even by subsequent post addition in an internal rubber mixer of a triglyceride oil, including soybean oil.

While certain representative embodiments and details have been shown for the purpose of illustrating the subject invention, it will be apparent to those skilled in this art that various changes and modifications can be made therein without departing from the scope of the subject invention.

What is claimed is:

1. A method for preparing an oil extended styrene-butadiene rubber comprising: (1) blending front 22 phr to about 60 phr of soybean oil into a styrene-butadiene rubber cement and (2) recovering the oil extended styrene-butadiene rubber from the styrene-butadiene rubber cement.

2. The method of claim 1 wherein the styrene-butadiene rubber cement is made by the copolymerization of styrene and 1,3-butadiene in an organic solvent.

3. The method of claim 2 wherein the organic solvent is relatively inert to the copolymerization.

4. The method of claim 2 wherein the copolymerization of the styrene and 1,3-butadiene is terminated prior to blending the soybean oil into the styrene-butadiene rubber cement.

5. The method of claim 2 wherein oil extended styrene-butadiene rubber is recovered from the styrene-butadiene rubber cement by removal of the organic solvent.

6. The method of claim 5 wherein the oil extended styrene-butadiene rubber is recovered from the styrene-butadiene rubber cement by steam stripping.

7. The method of claim 1 wherein from 24 phr to about 60 phr of the soybean oil is blended into the styrene-butadiene rubber cement.

8. The method of claim 1 wherein from 25 phr to about 40 phr of the soybean oil is blended into the styrene-butadiene rubber cement.

9. The method of claim 1 wherein the oil extended styrene-butadiene rubber is void of petroleum oils.

10. The method of claim 1 wherein the styrene-butadiene rubber in the cement blended with the soybean oil in step (1) has a Mooney ML 1+4 viscosity at 100° C. before being oil extended of greater than 140.

11. A triglyceride oil extended solution styrene-butadiene rubber comprising: a solution styrene-butadiene rubber and from 22 phr to about 60 phr of soybean oil, wherein the oil extended solution styrene-butadiene rubber is void of fillers.

12. The triglyceride oil extended solution styrene-butadiene rubber of claim 11 wherein the solution styrene-butadiene rubber is void of plasticizers.

13. The triglyceride oil extended solution styrene-butadiene rubber of claim 11 wherein the soybean oil is present at a level which is within the range of 24 phr to about 40 phr.

14. The triglyceride oil extended solution styrene-butadiene rubber of claim 11 wherein the triglyceride oil extended solution styrene-butadiene rubber has a Mooney ML 1+4 viscosity at 100° C. before being oil extended of greater than 120.

15. The triglyceride oil extended solution styrene-butadiene rubber of claim 11 wherein the triglyceride oil extended solution styrene-butadiene rubber has a Mooney ML 1+4 viscosity at 100° C. before being oil extended of greater than 140.

16. The triglyceride oil extended solution styrene-butadiene rubber of claim 11 wherein the triglyceride oil extended solution styrene-butadiene rubber has a Mooney ML 1+4 viscosity at 100° C. before being oil extended of greater than 100; and wherein the triglyceride oil extended solution styrene-butadiene rubber has a vinyl microstructure content of about 63.5 percent.

17. A rubber composition which is comprised of the triglyceride oil extended solution styrene-butadiene rubber of claim 11, about 0 phr to about 30 phr of at least one additional elastomer, and from about 40 phr to about 110 phr of at least one reinforcing filler.

18. A tire having a component which is comprised of the rubber composition of claim 17.

19. A tire having a component which is comprised of the triglyceride oil extended styrene-butadiene rubber of claim 11.

* * * * *